United States Patent [19]
Um

[11] Patent Number: 5,126,836
[45] Date of Patent: Jun. 30, 1992

[54] ACTUATED MIRROR OPTICAL INTENSITY MODULATION

[75] Inventor: Gregory Um, Torrance, Calif.

[73] Assignee: Aura Systems, Inc., El Segundo, Calif.

[21] Appl. No.: 448,748

[22] Filed: Dec. 11, 1989

Related U.S. Application Data

[63] Continuation-in-part of Ser. No. 429,987, Nov. 1, 1989.

[51] Int. Cl.⁵ .................... H04N 9/31; H04N 5/74
[52] U.S. Cl. ........................... 358/60; 358/62; 358/233; 359/618; 359/209
[58] Field of Search ............. 358/60, 61, 62, 231–234; 350/169, 17 A, 162.23, 601, 6.2; 359/618, 572, 573, 196, 197, 209

[56] References Cited

U.S. PATENT DOCUMENTS

| | | | |
|---|---|---|---|
| 3,507,984 | 11/1969 | Stavis | 358/63 |
| 3,549,800 | 12/1970 | Baker | 358/63 |
| 4,150,396 | 4/1979 | Hareng et al. | 358/60 |
| 4,213,146 | 7/1980 | Maiman | 358/63 |
| 4,441,791 | 4/1984 | Hornbeck . | |
| 4,566,935 | 1/1986 | Hornbeck . | |
| 4,571,603 | 2/1986 | Hornbeck et al. . | |
| 4,615,595 | 10/1986 | Hornbeck . | |
| 4,638,309 | 1/1987 | Ott . | |
| 4,680,579 | 7/1987 | Ott . | |
| 4,705,361 | 11/1987 | Frazier et al. . | |
| 4,710,732 | 12/1987 | Hornbeck . | |
| 4,856,863 | 8/1989 | Sampsell et al. . | |
| 4,859,012 | 8/1989 | Cohn . | |
| 4,956,619 | 9/1990 | Hornbeck . | |
| 4,979,030 | 12/1990 | Mura | 358/56 |
| 5,028,939 | 7/1991 | Hornbeck et al. . | |

OTHER PUBLICATIONS

Television—A New Schlieren Light Valve for Television Projection, by Van Raalte, Applied Optics, vol. 9, No. 10, Oct. 1970, pp. 2225–2230.

The Mirror-Matrix Tube: A Novel Light Valve for Projection Display, by Thomas et al., IEEE Transactions on Electron Devices, vol. ED-22, No. 9, Sep 1979, pp. 765–775.

TV Projection Display Using an Amorphous-Se-Type Ruticon Light Valve, by Lakatos et al., IEEE Transaction on Electron Devices, vol. ED-24, No. 7, Jul. 1977, pp. 930–934.

Micromechanical Light Modulator Array Fabricated on Silicon, by Petersen, Applied Physics Letters, vol. 31, No. 8, Oct. 15, 1977, pp. 521–523.

*Primary Examiner*—Victor R. Kostak
*Assistant Examiner*—Glenton B. Burgess
*Attorney, Agent, or Firm*—Poms, Smith, Lande & Rose

[57] ABSTRACT

A television display apparatus wherein a white light source emits a beam onto a plurality of dichroic mirrors which split the beam into three beams of the primary colors, then reflects the three primary beams onto three deformable reflective surfaces, which again reflect the beams through slits in a non-reflective surface, thereby modulating the intensity of the beams. The amount of light passing through the slits is horizontally scanned by one surface of a rotating polygonal mirror, then passes through collimating and projection lenses and onto a screen.

15 Claims, 4 Drawing Sheets

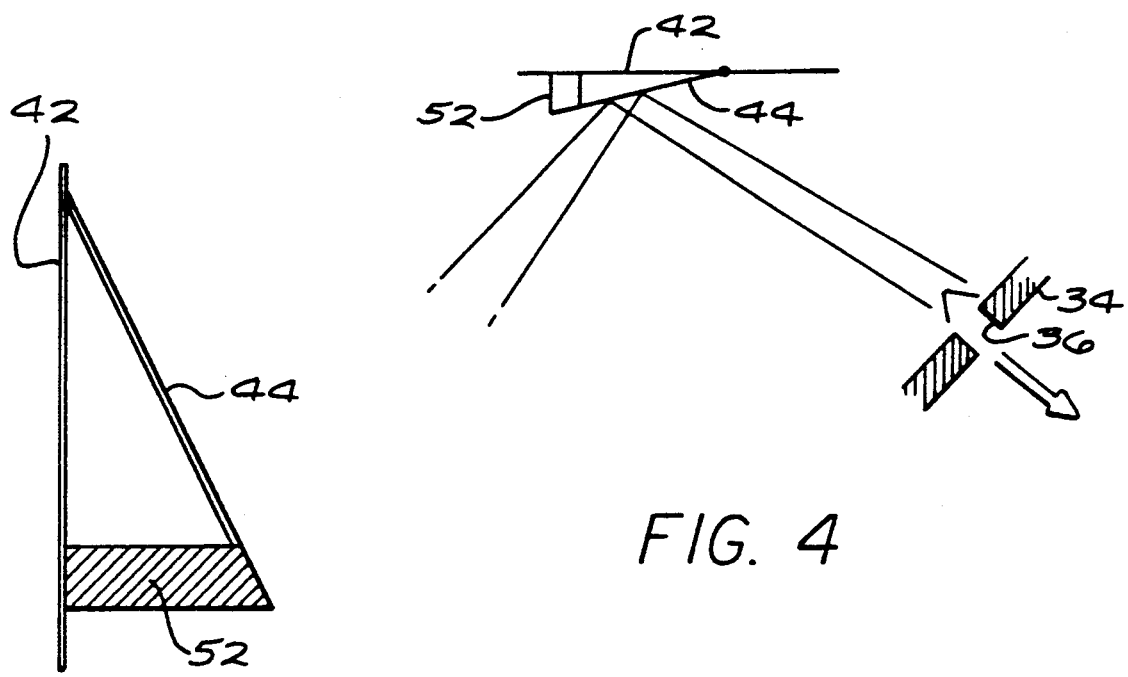
FIG. 3
FIG. 4
FIG. 5
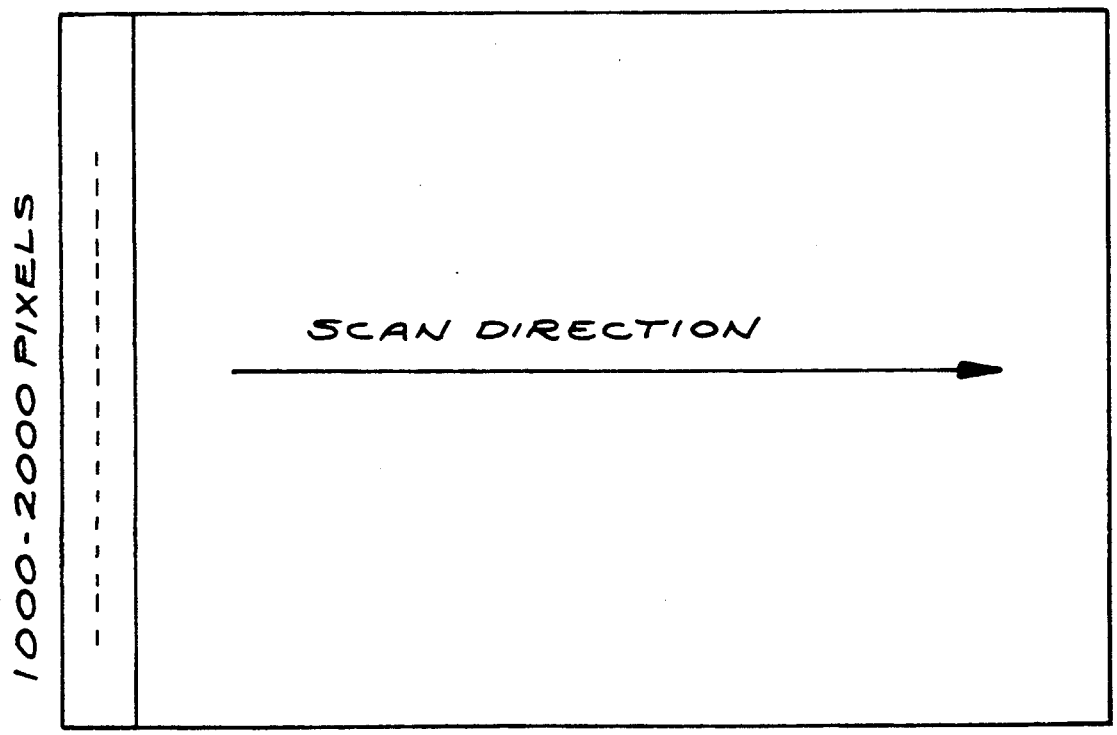

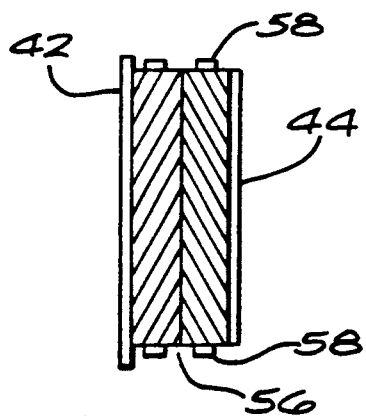
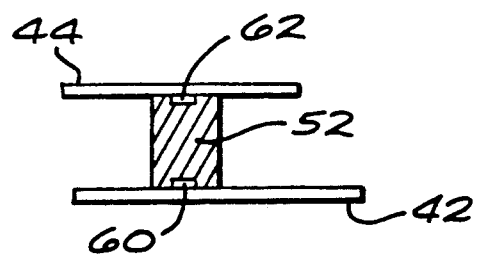
FIG. 6  FIG. 7
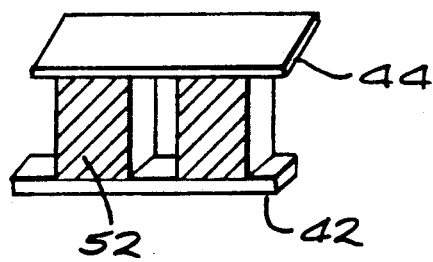
FIG. 8
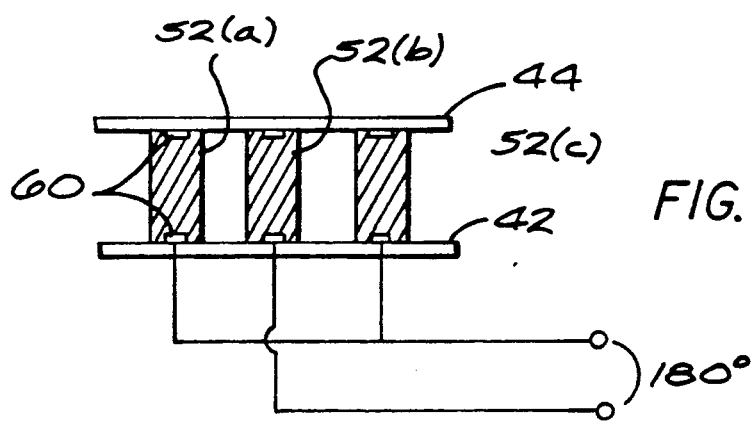
FIG. 9
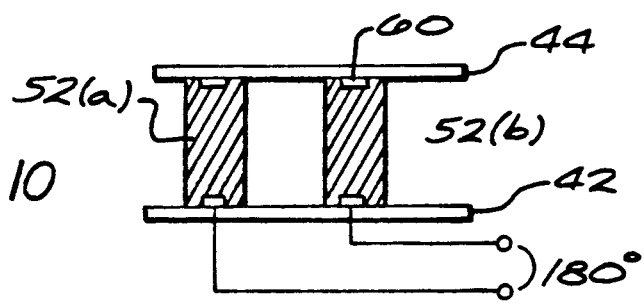
FIG. 10
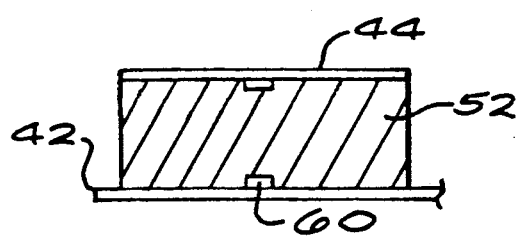
FIG. 11

ACTUATED MIRROR OPTICAL INTENSITY MODULATION

The present application is a continuation-in-part of U.S. Ser. No. 07/429,987 filed on Nov. 1, 1989.

BACKGROUND OF THE INVENTION

The present invention generally relates to a unique television display apparatus and, more specifically, to a television display apparatus which reflects light beams off of a mirror array and through slits in a non-reflective surface in order to modulate the intensity of the projected beams.

It is well known in the prior art to produce a television display by modulating beams of light in accordance with electrical signals received from a control system. The modulated beams of light are then converted into images by an optical scanning mechanism.

In order to create a color display, three beams of light must be modulated, one in each of the primary colors, red, green and blue. It is also well known in the art to split a white light beam into three primary colored beams. For example, in Stavis, U.S. Pat. No. 3,507,984, an argon laser beam is passed through a prism in order to split the beam into blue and green beams. In Biedermann, U.S. Pat. No. 3,510,571, a light source is split into three primary colored beams by passing the beam through interference mirrors and filters.

The beams of light are then typically modulated by conventional light modulators. This invention discloses a optical modulation television which will not require these conventional modulators.

It is known in the art to use rotating reflective surfaces in order to provide horizontal sweep. In Biedermann, the optical system for horizontal scan includes a rotating polygonal prism. In Roth, U.S. Pat. No. 3,760,096, the optical system for horizontal sweep includes a rotating pyramidal mirror.

SUMMARY OF THE INVENTION

This invention relates to a television display apparatus, and more particularly to a television display apparatus comprising a white light source having a collimation lens; means for splitting said white light into three primary light beams; means for spreading said primary light beams; a non-reflective surface having apertures therein; means for providing horizontal sweep of the light beams onto the screen; a second collimation lens; and a projection lens. Accordingly, it is the object of this invention to provide a unique optical modulation television which replaces a conventional light modulator with the combination of a mirror array and a non-reflective surface with apertures therein.

The foregoing and other objects, features and advantages of this invention will be apparent from the following, more particular, description of the preferred embodiments of this invention, as illustrated in the accompanying drawings.

BRIEF DESCRIPTION OF THE DRAWINGS

FIG. 3 is an enlarged side view of one reflective surface of the mirror array.

FIG. 4 is diagrammatic side view of the light beam, tilt mirror array and non-reflective surface with apertures.

FIG. 5 is a graph of horizontal scan direction of the pixels.

FIG. 6 is an enlarged side view of one reflective surface mounted on a bimorphic piezoelectric crystal layer.

FIG. 7 is an enlarged perspective view of one reflective surface mounted on one piezoelectric crystal.

FIG. 8 is an enlarged perspective view of one reflective surface with notches therein mounted on a plurality of piezoelectric crystals.

FIG. 9 is an enlarged side view of one reflective surface mounted on three piezoelectric crystals.

FIG. 10 is an enlarged side view of one reflective surface mounted on two piezoelectric crystals.

FIG. 11 is an enlarged side view of one reflective surface mounted on a single piezoelectric crystal.

DESCRIPTION OF THE PREFERRED EMBODIMENT

Figure 1:
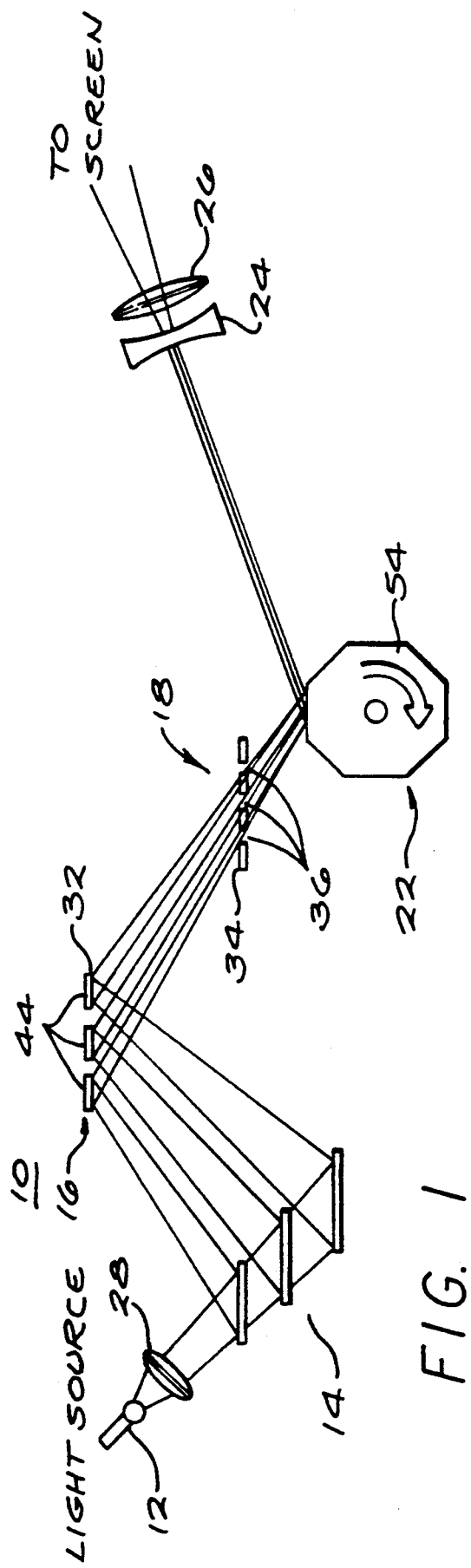
FIG. 1 is a diagrammatic view of the unique modulation television.
Figure 2:
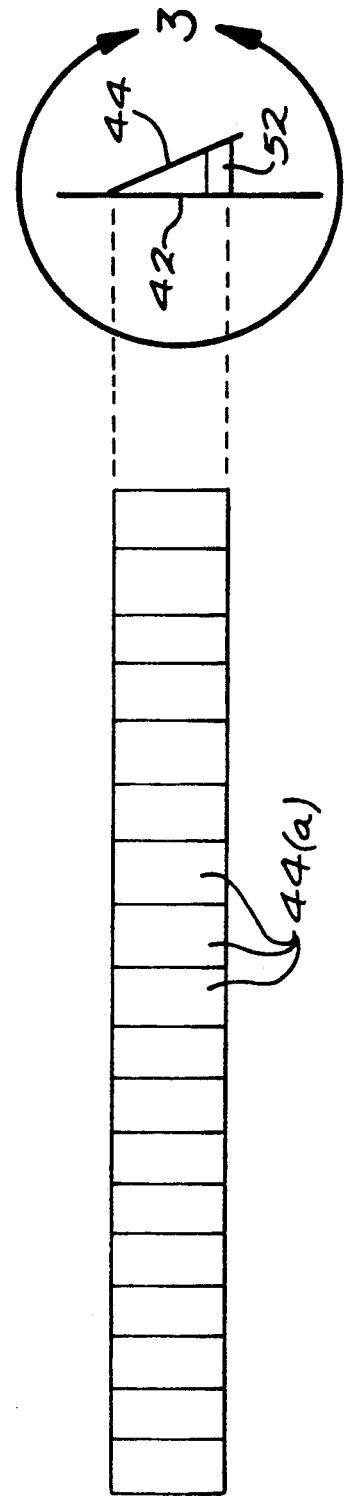
FIG. 2 is a top and a side view of one reflective surface of the mirror array.

Referring now to the accompanying drawings which set forth the present invention in greater detail and in which like numerals designate like features, FIG. 1 shows a unique modulation television 10 which comprises a white light source 12, means 14 for splitting said white light into three primary beams, means 16 for spreading each of said primary beams into a bell-shaped beam, means 18 for clipping said bell-shaped beams, horizontal scanning means 22, a second collimation lens 24, and a projection lens 26. In operation, the light source 12 emits a high intensity white light which passes through a first collimation lens 28 to form a collimated light beam. The collimated light beam illuminates the splitting means 14 which breaks the white light into three primary light beams, each being one of the primary colors; red, green and blue. In the preferred embodiment, the splitting means is a plurality of dichroic mirrors 20. However, in alternative embodiments, either a diffraction grating or a prism could be used to split the collimated white light beam into three primary light beams. In another embodiment, the white light source 12, the first collimating lens 28, and the splitting means 14 could be replaced by three coherent lasers, each being one of the primary colors.

In order to modulate the beams to their desired intensity, the spreading means 16 and clipping means 18 are used in combination. In the preferred embodiment, the spreading means 16 is comprised of a mirror array 32 and the clipping means 18 is comprised of a non-reflective surface 34 with a plurality of apertures 36 therein. The mirror array 32 in the preferred embodiment is comprised of three reflective surfaces 44, one reflective surface 44 corresponding to each primary light beam. The plurality of apertures 36 may either be a plurality of pinholes or a plurality of knife-edged slits.

As best shown in FIG. 3, a flat rigid base 42 is used to support the reflective surface 44 of the mirror array 32. The flat rigid base 44 is preferably constructed of a ceramic or silicone substrate. The mirror array 32 is comprised of three reflective surfaces 44, with one reflective surface 44 for each of the primary light beams. For each reflective surface 44, a piezoelectric crystal 52 is layered onto the flat rigid base 42. The reflective surface 44 is then layered on top of the piezoelectric crystal 52 and the flat rigid base 42. The reflective surface 44 is attached at one end to the flat rigid base 42, and at the opposite end to the piezoelectric crystal 52. Alternatively, the reflective surface 44 may be clamped to the flat rigid base 42. The layered flat rigid base 42, piezoelectric crystal 52, and reflective surface 44 are then divided into segments to form a plurality of disjointed reflective surfaces 44(a). Each of the disjointed reflective surfaces 44(a) comprises a pixel.

When a voltage is applied to the piezoelectric crystal 52, the crystal 52 deforms causing the reflective surface 44 to tilt. In this embodiment, the piezoelectric crystal 52 deforms vertically when voltage is applied. As an alternative, a constant frequency, varying voltage can be applied to the crystal 52 which causes the crystal 52 and, in turn, the reflective surface 44 to vibrate vertically with a controllable amplitude.

In another alternative embodiment of the invention shown in FIG. 6, the reflective surface 44 is mounted upon a bimorphic piezoelectric crystal layer 56. For this embodiment, the piezoelectric crystal layers 56 deform horizontally when voltage is applied. Each layer has an electrode 58 on one end. A different voltage is applied to each crystal layer 56, causing one layer to expand horizontally while another layer contracts horizontally. As a result, the reflective surface 44 bends. The control voltage is applied to the piezoelectric material 52 or crystal layer 56 similar to conventional video display technology by electronic control circuitry similar to that used in a bit mapped memory.

As shown in FIG. 7, an alternative embodiment of the mirror array 32 comprises each reflective surface 44 being layered on top of and attached to the piezoelectric crystal 52. The piezoelectric crystal 52 forms a pedestal upon which the reflective surface 44 is supported. The piezoelectric crystal 52 is further layered on top of and attached to the flat rigid base 42. One of a plurality of metal contacts 60 is mounted between the piezoelectric crystal 52 and the reflective surface 44. Another one of the metal contacts 60 is mounted between the piezoelectric crystal 52 and the flat rigid base 42. The reflective surface 44 is not attached directly to the flat rigid base 42. The piezoelectric crystal 52 deforms vertically when a voltage is applied. Therefore, when voltage is applied to the piezoelectric crystal 52, the crystal 52 and, in turn, the reflective surface 44 vibrate in a vertical direction.

An alternative embodiment of the mirror array 32 is shown in FIG. 8. In this embodiment, each of the reflective surfaces 44 is layered on top of and attached to a plurality of piezoelectric crystals 52. The piezoelectric crystals 52 form a pedestal upon which the reflective surfaces 44 are supported. Preferably, two piezoelectric crystals 52 are used; a primary piezoelectric crystal 52(a), and a secondary piezoelectric crystal 52(b). Each of the plurality of piezoelectric crystals 52 is further layered on top of and attached to the flat rigid base 42. The reflective surface 44 is not directly attached to the flat rigid base 42. The piezoelectric crystals 52 deform vertically when a voltage is applied. However, the voltage applied to the primary piezoelectric crystal 52(a) is 180 degrees out of phase with the secondary piezoelectric crystal 52(b). As a result, the reflective surface 44 vibrates vertically as voltage is applied to the crystals 52.

Another embodiment of the invention is shown in FIG. 9. In this embodiment, each of the reflective surfaces 44 is layered on top of three piezoelectric crystals 52; a first piezoelectric electric crystal 52(a), a second piezoelectric crystal 52(b), and a third piezoelectric crystal 52(c). The piezoelectric crystal 52(a), (b) and (c) are formed in the shape of a pedestal to support the reflective surface 44. A ground wire 62 is run across the top of the reflective surfaces 44 to provide grounding. Each of the piezoelectric crystals 52(a), (b) or (c) expand and contract vertically when a voltage is applied to the crystals 52(a), (b) or (c). The piezoelectric crystals 52(a), (b) and (c) are amounted upon the flat rigid base 42. The voltages applied to the first 52(a) and third 53(c) piezoelectric crystals are in phase with each other. However the voltage applied to the second piezoelectric crystal 52(b) is 180 degrees out of phase with the voltage applied to the first 52(a) and second 52(c) piezoelectric crystals. Therefore, when voltage is applied to the piezoelectric crystal 52(a), (b), and (c), the reflective surface 44 tilts upward and then downward in a triangular-shaped configuration.

Another embodiment of the invention is shown in FIG. 10. In this embodiment, the reflective surface 44 is mounted on two piezoelectric crystals 52. The piezoelectric crystals deform horizontally when a voltage is applied to them. The crystals 52 are mounted on the flat rigid base 42. The crystals 52 are each mounted on opposite ends of the reflective surface 44, which leaves the center of the reflective surface 44 unsupported. When voltage is applied to the piezoelectric crystals 52, the crystals 52 deform horizontally which results in a vertical motion in the reflective surface 44.

In FIG. 11, a variation of the previously described embodiment is shown. In this embodiment, the reflective surface 44 is layered on a single piezoelectric crystal 52. The piezoelectric 52 is of the same dimensions as the reflective surface 44. Therefore, the entire cross-section of the reflective surface 44 is supported by the crystal 52. The crystal 52 is securely attached to the reflective surface 44 at each end of the reflective surface 4. The piezoelectric crystal 52 is mounted on the flat rigid base 42. The piezoelectric crystal 52 deforms horizontally when voltage is applied to it. Therefore, when voltage is applied, the crystal 52 expands and contracts horizontally, causing the reflective surface 44 to flex in the center, where it is not securely attached to the crystal 52. The reflective surface 44 will flex into a triangular shape.

Figure 12:
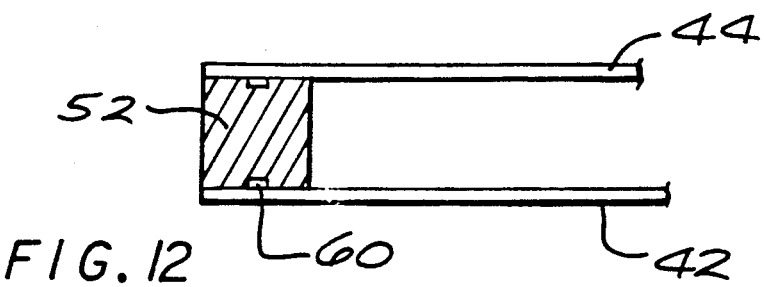
FIG. 12 is an enlarged side view of one reflective surface cantilevered on one piezoelectric crystal.

FIG. 12 shows another embodiment of the invention. The reflective surface 44 is mounted in a cantilever fashion on the single piezoelectric crystal 52. The crystal 52 is mounted on the flat rigid base 42. The piezoelectric crystal 52 expands and contracts horizontally when a voltage is applied. Therefore, when voltage is applied, the reflective surface 44 will vibrate up and down as the crystal 52 deforms.

In another embodiment of the invention, each disjointed reflective surface 44(a) is shaped with a plurality of notches 40 located near the ends of the disjointed reflective surface 44(a). The notches 40 are shown in FIG. 8. The notches 40 allow heat expansion of the reflective surface 44 with only the desired amount of deformation of the reflective surface 44.

As shown in FIG. 1, each primary color beams illuminates a respective reflective surface 44 of the mirror array 32. Each reflective surface 44 is tilted, vibrated, or bent at an angle in accordance with the predetermined intensity of the pixel.

The beams reflected from the moving reflective surface 44 are spread into a bell-shaped beam. The flux and reflected angle of the bell-shaped beam is controlled for intensity modulation. To complete the intensity modulation, the bell-shaped beams are then reflected toward the clipping means 18, which in the preferred embodiment is the non-reflective surface 34. When a voltage is not applied to the piezoelectric crystals 52, the reflective surfaces 44 do not vibrate, tilt, or bend, and the beams reflected off of the mirror array 32 either do not spread or are aimed directly at the apertures 36 of the non-reflective surface 34. If the reflected beams are aimed directly at the apertures 36, a maximum amount of light from the reflected beams will pass through the apertures 36. However, when a voltage is applied to the piezoelectric crystals 52, the reflective surfaces 44 vibrate, tilt, or bend, depending on the embodiment used, and cause the beams reflecting off of the mirror array 32 to spread into bell-shaped beams. Therefore, only a restricted amount of light from the reflected beams pass through the plurality of apertures 36. The amount of light which passes through the plurality of apertures 36 determines the intensity of the respective pixels and colors. The apertures 36 can be pinholes or knife-edged slits.

Figure 13:
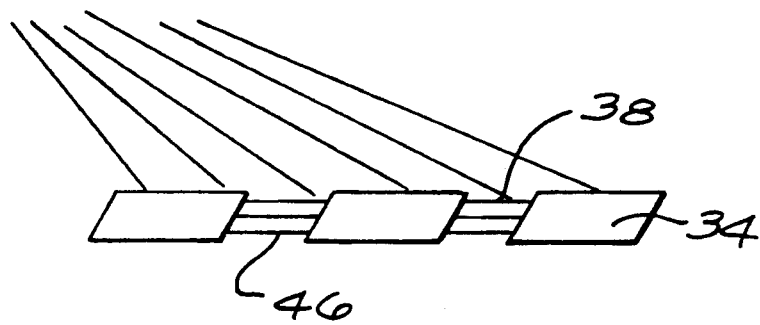
FIG. 13 is an enlarged perspective view of the non-reflective surface, with a plurality of apertures and plurality of wire strips therein.

As shown in FIG. 13, in an alternative embodiment of the invention, the non-reflective surface 34 with the plurality of apertures 36 further includes a plurality of wire strips 38. Each aperture 36 contains at least one of the plurality of wire strips 38 located within. The wire strips 38 are located within the apertures 36 so that when no voltage is applied to the piezoelectric crystals 52, the light beams reflected off the mirror array 32 are blocked from passing through the apertures 36 by the wire strips 38 within the apertures 36. When voltage is applied to the piezoelectric crystals 52, the light beams reflected off the mirror array 32 are spread into bell-shaped beams. Because the beams are spread, a restricted amount of light passes around the wire strips 38 and through the apertures 36. This amount of light which passes through each aperture 36 determines the intensity of that primary color beam.

The beams which pass through the plurality of apertures 36 of the non-reflective surface 34 then impinge upon the horizontal scanning means 22. In the preferred embodiment of the invention, the horizontal scanning means 22 is a polygonal rotating mirror 54. The beams reflect simultaneously off of one surface of the polygonal mirror 54 to provide a horizontal sweep of the column of pixels from each reflective surface 44 of the mirror arrays 32. The horizontal sweep of the column of pixels is shown in FIG. 5. In an alternative embodiment, the horizontal scanning means is a galvanometer mirror, also known in the art as a galvo mirror. In another embodiment, the horizontal scanning means 22 is a rotating holographic plate.

In another alternative embodiment, the horizontal scanning is accomplished by aligning the reflective surfaces 44 of the mirror array 32 and scanning the row of pixels on each reflective surface 44 vertically.

Figure 14:
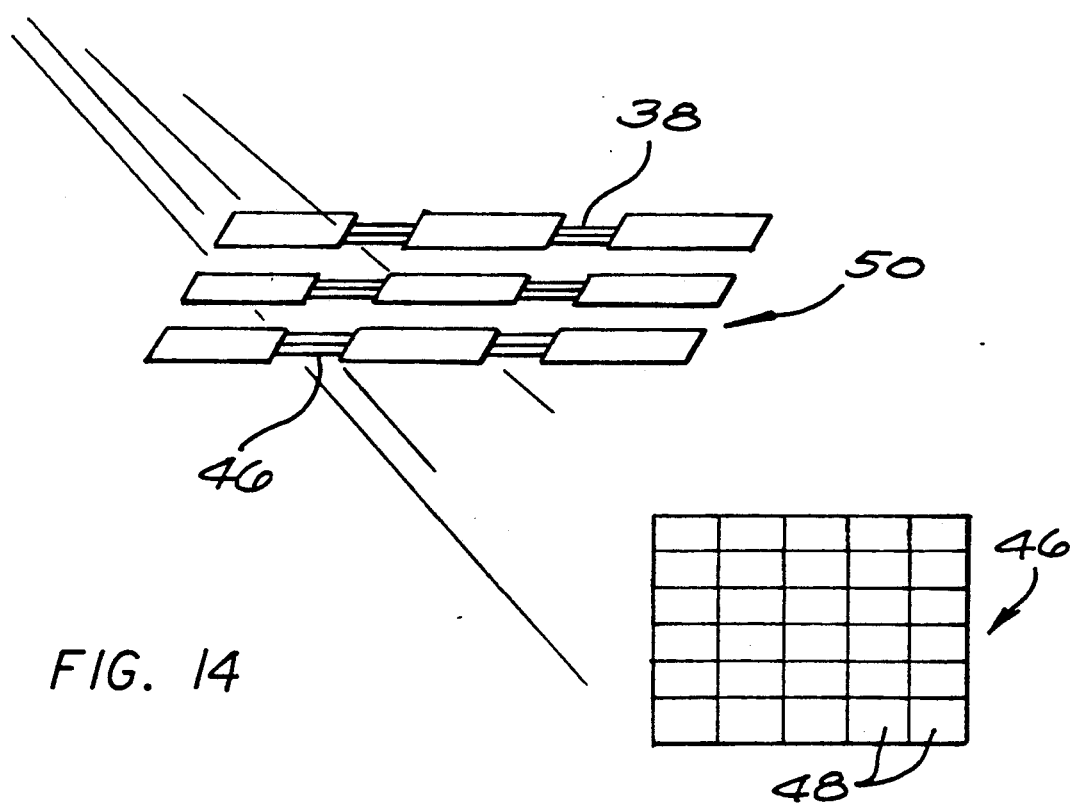
FIG. 14 is a perspective view of the two dimensional mirror array and apertures.

In an alternative embodiment shown in FIG. 14, the horizontal scanning means 22 is eliminated by the use of a two-dimensional mirror array 46. The two-dimensional mirror array is formed by cascading a plurality of reflective surfaces 44, then dividing the reflective surfaces 44 into segments both horizontally and vertically, thereby forming a grid of segments 48. The apertures 36 are also formed in a two-dimensional grid 50 on a non-reflective surface. One two-dimensional reflective surface is required for each primary light beam reflected off the splitting means 14. The use of the two-dimensional mirror array 46, and two-dimensional apertures grid 50 covers the whole image field instantaneously, thereby eliminating the need for the horizontal scanning means 22.

The scanned beams are then passed through a second collimation lens 24 and a projection lens 26 in order to project an image upon the screen.

While the invention has been particularly shown and described in reference to the preferred embodiments thereof, it will be understood by those skilled in the art that changes in form and details may be made without departing from the scope of the invention.

We claim:

1. A television display apparatus comprising:
   a source for emitting white light;
   means for splitting said white light into a plurality of primary light beams, each of said primary light beams being one of the primary colors;
   means for spreading each of primary light beams into a bell-shaped beam wherein said spreading means is a mirror array and further wherein said mirror array is comprised of a plurality of reflective surfaces;
   means for clipping the profile of each of said bell-shaped beams into a clipped beam;
   means for horizontally scanning each of said clipped beam simultaneously;
   means for collimating said scanned light into a collimated beam; and
   means for projecting said collimated beam onto a screen.

2. A television display apparatus in accordance with claim 1 wherein said deforming means is a piezoelectric crystal which deforms horizontally when a voltage is applied.

3. A television display apparatus in accordance with claim 1 wherein said deforming means is a plurality of piezoelectric crystals which deform when voltage is applied to them.

4. A television display apparatus in accordance with claim 3 wherein the voltage applied to at least one of said plurality of piezoelectric crystals is 180 degrees out of phase with the voltage applied to at least one of another of said plurality of piezoelectric crystals.

5. A television display apparatus in accordance with claim 2 wherein each of said reflective surfaces of said mirror array is cantilevered on said piezoelectric crystal.

6. A television display apparatus in accordance with claim 1 wherein each of said plurality of reflective surfaces further comprise a plurality of notches along the periphery of said reflective surface.

7. A television display apparatus comprising:
   a source for emitting a white light;
   means for splitting said white light into a plurality of primary light beams, each of said primary light beams being one of the primary colors;
   means for spreading each of said primary light beams into a bell-shaped beam wherein said spreading means is a mirror array, said spreading means further including means for deforming each reflective surface of said mirror array in response to signals received by electrical control circuitry, said reflective surface being only attached to said deforming means;

means for clipping the profile of each of said bell-shaped beam into a clipped beam;

means for horizontally scanning each of said clipped beams simultaneously;

means for collimating said scanned light into a collimated beam; and means for projecting said collimated beam onto a screen.

8. A television apparatus comprising:

a source of light wherein said light is formed into a beam;

an array of reflective surfaces upon which said beam is incident, each of said reflective surfaces being arranged in a plurality of rows and in a plurality of columns and further being deformable with the degree of deformation of each of said surfaces being commensurate with a predetermined intensity of a corresponding one of a plurality of pixels to be displayed;

a non-reflective surface having a plurality of apertures therein, each of said reflective surfaces directing a corresponding one of a plurality of reflected beams generally to a respective one of said apertures such that the flux of each of said reflected beams passing through said respective one of said apertures decreases with an increasing degree of movement of a corresponding one of said reflective surfaces to control an intensity of each of said beams; and a projection lens upon which each of said reflected beams is incident subsequent to passing through said apertures to project said reflected beams on a screen whereby said pixels are displayed.

9. A television apparatus as set forth in claim 8 wherein the deformation of each of said reflective surfaces is a tilting of each of said surfaces.

10. A television apparatus as set forth in claim 8 wherein the deformation of each of said reflective surfaces is a bending of each of said reflective surfaces.

11. A television apparatus as set forth in claim 8 wherein said deformation of each of said reflective surfaces is a vibration of each of said reflective surfaces.

12. A method of displaying a plurality of pixels on a screen comprising steps of:

forming a light beam;

illuminating a plurality of reflective surfaces arranged in a plurality of rows and a plurality of columns with said beam;

deforming each of said reflective surfaces wherein the degree of deformation of each of said reflective surfaces is commensurate with a predetermined intensity of one of said pixels;

directing the reflected beams from each of said reflective surfaces to one of a plurality of apertures, wherein each of said apertures corresponds to one of said reflective surfaces, such that the flux of each of said reflective beams passing through of said corresponding one of said reflective surfaces controls an intensity of reflected beams; and projecting each of said reflective beams subsequent to passing through said corresponding one of said apertures on a screen whereby pixels are displayed.

13. A method as set forth in claim 12 wherein said deforming step includes the substeps of tilting each of said reflective surfaces.

14. A method as set forth in claim 12 wherein said deforming step includes the substeps of bending each of said reflective surfaces.

15. A method as set forth in claim 12 wherein said deforming step includes the substeps of vibrating each of said reflective surfaces.

* * * * *